Patented Mar. 30, 1943

2,315,401

UNITED STATES PATENT OFFICE 2,315,401

THERMOSETTING AMINOTRIAZINE-FORM-ALDEHYDE CONDENSATION PRODUCT

Gaetano F. D'Alelio, Pittsfield, Mass., assignor to General Electric Company, a corporation of New York No Drawing. Application October 19, 1940, Serial No. 361,976

14 Claims. (Cl. 260—42)

This invention relates broadly to resinous compositions. More particularly it is concerned with thermosetting resins and molding (moldable) compositions comprising a soluble, fusible condensation product of a mixture comprising an aminotriazine (e. g., melamine) and formaldehyde and, in addition to said condensation product, a novel curing accelerator, specifically oxamide. The scope of the invention also includes products comprising the cured resinous compositions.

It has been known heretofore that aminotriazines can be condensed with formaldehyde under neutral, acid or alkaline conditions to yield soluble, fusible resinous condensation products. Such condensation products as ordinarily prepared have little time stability, that is, they advance rapidly toward an insoluble and infusible condition during the usual storage periods prior to use. The acid-catalyzed condensation products are particularly poor in time stability. The conventional alkaline-catalyzed aminotriazine-formaldehyde condensation products have better time stability than the acid-catalyzed products but frequently gel during storage prior to use or, in the case of the ammonia-catalyzed products, often gel during the condensation reaction. Aminotriazine-formaldehyde condensation products having good storage stability can be prepared by causing the condensation reaction between the aminotriazine and the aldehyde to take place in the presence of a primary condensation catalyst and a secondary condensation catalyst. To obtain such condensation products, having good time- or storage-stability characteristics, I have found that the primary catalyst should be a member of the class consisting of (1) nitrogen-containing basic tertiary compounds that are aldehyde-non-reactable, e. g., tertiary amines such as trialkyl (for example, trimethyl, triethyl, etc.) amines, triaryl (for example, triphenyl) amines, etc., and (2) nitrogen-containing basic compounds that are aldehyde-reactable, for instance ammonia, primary amines (e. g., ethyl amine, propyl amine, etc.) and secondary amines (e. g., dipropyl amine, dibutyl amine, etc.). The secondary condensation catalyst, which ordinarily is used in an amount less than the amount of primary catalyst, should be a fixed alkali, for instance, hydroxides, carbonates and cyanides of the alkali metals (e. g., sodium, potassium, lithium, etc.). Although such catalyzed aminotriazine-formaldehyde condensation products have good time stability, they are not curable in the absence of a curing catalyst to an insoluble, infusible state in any reasonable time and, therefore, their field of utility is limited. If curing catalysts of an acidic nature are incorporated into these condensation products, they can be cured under heat to an insoluble and infusible condition, but the addition of such acid bodies has a harmful effect upon the storage stability of the resin or molding composition made therefrom.

The present invention is based on my discovery that oxamide constitutes an effective agent for the curing of potentially reactive (heat-curable) aminotriazine-formaldehyde condensation products and molding compositions prepared from such products. Although not limited to the curing of potentially reactive aminotriazine-formaldehyde condensation products obtained with the aid of any specific condensation catalyst or mixture of condensation catalysts, I have found that oxamide is particularly effective in accelerating the conversion to an insoluble, infusible state, under heat or under heat and pressure, of those soluble, fusible condensation products that are obtained by reaction of an aminotriazine and formaldehyde while admixed with a primary and a secondary catalyst of the kinds above described.

Compositions comprising a soluble, fusible condensation product of a mixture comprising essentially an aminotriazine and formaldehyde and, in addition to said condensation product, a relatively small amount of oxamide as an accelerator of curing having excellent storage stability as compared with those compositions otherwise the same but containing a curing catalyst of an acidic nature in place of oxamide. The oxamide-containing compositions cure rapidly under heat or under heat and pressure to an insoluble, infusible state. The cured products have high resistance to heat, moisture and arcing, have excellent mechanical strength, good surface finish and, in general, are wholly suited for all the service applications for which products of this general class are used. These results were quite surprising and unexpected, since in no way could it have been predicted from the known properties of oxamide (or its homologues) and of potentially reactive aminotriazine-formeldehyde condensation products that oxamide would function as an accelerator of curing of such condensation products. The specific nature of oxamide as a curing accelerator is evidenced by the fact that other members of the homologous series, e. g., succinic diamide, malonic diamide, etc., do not function as curing accelerators for aminotriazine-formaldehyde partial condensation products. The results are all the more surprising when it is considered that oxamide does not appreciably accelerate the curing of such closely related condensation products as, for example, urea-formaldehyde and thiourea-formaldehyde condensation products.

In order that those skilled in the art better may understand how the present invention may be carried into effect, the following illustrative examples thereof are given. All parts are by weight.

Example 1

This example illustrates the results obtained when effort is made to cure condensation products of urea and formaldehyde and of thiourea and formaldehyde with oxamide.

| | Parts by weight | | | |
|---|---|---|---|---|
| | (a) | (b) | (c) | (d) |
| Urea | 120.0 | 120.0 | 120.0 | 120.0 |
| Aqueous solution of formaldehyde (approx. 37.1% HCHO) | 320.0 | 320.0 | 320.0 | 320.0 |
| Aqueous ammonia (28% NH$_3$) | 11.0 | 11.0 | 11.0 | 11.0 |
| Sodium hydroxide in 57 parts water | 1.2 | 1.2 | 1.2 | 1.2 |
| Oxamide | 2.0 | 4.0 | 6.0 | 6.0 |

In each case all of the above components, with the exception of the oxamide, were mixed and heated under reflux for 30 minutes. In cases (a), (b) and (c) the oxamide was added to the liquid condensation product and heating under reflux was continued for an additional 10 minutes. In case (d) the oxamide was added after 30 minutes' refluxing and then heating under reflux was continued for an additional 60 minutes. Molding compounds were made by adding to each syrup 140 parts alpha cellulose in flock form and 0.8 part of a mold lubricant, specifically zinc stearate. The wet compounds were dried for 5 hours at 70° C. Molded articles were made from the dried compositions by molding each for 5 minutes at 130° C. under a pressure of 2,000 pounds per square inch. The molded pieces did not cure to an insoluble, infusible state as evidenced by the fact that in each case the molded piece disintegrated completely when immersed in boiling water for 5 minutes.

| | Parts by weight | |
|---|---|---|
| | (a) | (b) |
| Thiourea | 148.0 | 148.0 |
| Aqueous solution of formaldehyde (approx. 37.1% HCHO) | 320.0 | 320.0 |
| Aqueous ammonia (28% NH$_3$) | 11.0 | 11.0 |
| Sodium hydroxide in 57 parts water | 1.2 | 1.2 |
| Oxamide | 2.0 | 6.0 |

In both cases all of the components with the exception of the oxamide were mixed and heated under reflux for 30 minutes. In (a) the oxamide was added and heating under reflux was continued for an additional 10 minutes. In (b) refluxing was continued for one hour after the oxamide had been added. Molding compounds were prepared by adding to each resin syrup 140 parts alpha cellulose in flock form and 0.8 part zinc stearate. The wet compounds were dried for 5 hours at 70° C. Molding the dried compounds for 5 minutes at 130° C. under a pressure of 2,000 pounds per square inch yielded uncured molded pieces.

Example 2

This example illustrates the results obtained when oxamide is incorporated into a soluble, fusible condensation product of a mixture comprising an aminotriazine, specifically melamine, and formaldehyde, the resulting composition made into a molding compound and thereafter molded under heat and pressure.

| | Parts by weight |
|---|---|
| Melamine | 126.0 |
| Aqueous solution of formaldehyde (approx. 37.1% HCHO) | 240.0 |
| Aqueous ammonia (28% NH$_3$) | 12.0 |
| Sodium hydroxide in 10 parts water | 0.2 |
| Oxamide | 1.7 |

All of the above components with the exception of the oxamide were heated under reflux for 10 minutes, after which the oxamide was added and refluxing was continued for an additional 10 minutes. A molding composition was prepared by incorporating into the resin syrup 116.5 parts alpha cellulose in flock form and 0.7 part zinc stearate. The wet compound was dried for 3 hours at 70° C. The dried compound was molded for 5 minutes at 130° C. under a pressure of 2,000 pounds per square inch. The molded piece was hard, mechanically strong, had a good surface finish and was well-cured throughout as evidenced by the fact that it did not swell or disintegrate or show any other signs of being attacked when immersed in boiling water for 45 minutes.

A resin syrup was made as described above with the exception that oxamide was omitted from the formulation. The total reflux time was 20 minutes. Molding compounds and molded articles were made in identically the same manner as those containing oxamide. The molded pieces were uncured and the resin was not converted to an insoluble, infusible state as evidenced by the fact that when the pieces were immersed in boiling water for 45 minutes they softened, became swollen, partly disintegrated, lost their smooth surface finish and developed a rough, chalk-like surface. Such uncured molded articles would have no commercial utility.

Although oxamide does not accelerate the curing of condensation products of, for example, urea and formaldehyde, thiourea and formaldehyde, etc., to an insoluble and infusible state (see Example 1), I have surprisingly found that when an aminotriazine, specifically melamine, is one of the starting reactants in addition to urea or equivalent material, then for some unexplainable reason the oxamide is able to accelerate the curing of the resulting condensation product. For optimum results in the curing of such mixed or co-condensation products with oxamide, the amount of aminotriazine should be at least 25 mol per cent of the molar amount of urea, thiourea, dicyandiamide or other material which when condensed with formaldehyde in the absence of aminotriazine yields an oxamide-noncurable, soluble, fusible condensation product. Preferably I use at least 0.4 mol of the aminotriazine, specifically melamine, for each mol of urea or equivalent material. Obviously higher amounts may be employed, for example from equimolecular proportions of aminotriazine and urea or its equivalent to from 10 to 100 mols of the aminotriazine for each mol of urea or equivalent material. This modification of the invention will be understood more clearly from a consideration of the following example:

*Example 3*

|  | Parts by weight | |
|---|---|---|
|  | (a) | (b) |
| Melamine | 76.0 | 76.0 |
| Urea | 84.0 | 84.0 |
| Aqueous solution of formaldehyde (approx. 37.1% HCHO) | 360.0 | 360.0 |
| Aqueous ammonia (28% NH₃) | 24.0 | 24.0 |
| Sodium hydroxide in 10 parts water | 0.2 | 0.2 |
| Oxamide | | 2.2 |

In case (a), wherein the oxamide was omitted, all of the components were heated under reflux for 20 minutes. In case (b) all of the components with the exception of the oxamide were refluxed for 10 minutes, after which the oxamide was added and refluxing was continued for an additional 10 minutes. To each of the resulting resin syrups were added 186 parts alpha cellulose in flock form and 1.2 parts zinc stearate. The wet compounds were dried at 70° C. The dried compounds were molded for 5 minutes at 130° C. under a pressure of 2,000 pounds per square inch. Resin (a), which contained no oxamide, yielded molded pieces that were uncured and would have no practical utility. When the molded pieces were immersed in boiling water for 15 minutes they softened and partly disintegrated, became swollen, lost their smooth surface finish and developed a rough, chalk-like surface, showing that the resin had not cured to an insoluble, infusible state. In marked contrast resin (b), which contained oxamide, yielded molded articles that were hard and had a good surface finish both before and after immersing in boiling water. That the resin had cured to an insoluble, infusible state was established by the fact that the molded pieces did not swell or disintegrate or show any other signs of being attacked when immersed in boiling water for 15 minutes.

Although in the foregoing examples I have shown the oxamide as being incorporated into the resinous mass after the starting components have been partly reacted to form a soluble, fusible resin, I am not limited to this specific procedure. For example, the oxamide may be added at the start of the condensation reaction or after the reaction between the components has advanced to the stage where the resin has the properties desirable for manufacturing into a molding composition or a varnish. Or, the oxamide may be mixed with the components of the molding composition (fillers, plasticizers, mold lubricants, etc.) at any convenient stage in the preparation of such compositions.

The amount of oxamide which is incorporated into the resin or into the molding composition may vary considerably, depending largely upon the particular curing rates desired. In general, however, only a relatively small amount of oxamide is used and, preferably, not exceeding substantially one-tenth mol of oxamide per mol of aminotriazine, e. g., melamine, or per mol of total aminotriazine and other formaldehyde-reactable starting component, if any such last-named components are employed in conjunction with the aminotriazine in producing the heat-curable condensation product.

In carrying the present invention into effect the condensation reaction between the formaldehyde (or a compound engendering formaldehyde), e. g., paraformaldehyde, hexamethylene tetramine, etc.) and the aminotriazine (or mixture comprising an aminotriazine and one or more other aldehyde-reactable organic compounds, e. g., urea, thiourea, dicyandiamide, malonic diamide, itaconic diamide, maleic diamide, etc.) may be carried out under acid, neutral or alkaline conditions, at atmospheric, sub-atmospheric or super-atmospheric pressure, and in the presence or absence of a solvent for the initial condensation product. I prefer to form the resin initially under alkaline conditions, that is at a pH above 7.0. More particularly, I prefer to form the initial condensation product by causing an aminotriazine, e. g., melamine, and formaldehyde to react while admixed with a primary and a secondary condensation catalyst such as hereinbefore described, specifically a condensation catalyst comprising ammonia and a fixed alkali, e. g., sodium hydroxide. Various mol ratios of reactants may be employed as desired or as conditions may require, but the proportions usually are within the range of 1 mol aminotriazine to from 1 to 6 or 7 mols formaldehyde. For example, in producing a potentially reactive melamine-formaldehyde resinous condensation product I advantageously may use 1 mol melamine to from 1½ to 3¼ mols formaldehyde.

Illustrative examples of aminotriazines that may be employed in producing the potentially reactive condensation products are triazines containing at least one amino group, e. g., melamine, ammeline, ammelide, formoguanamine, 2-amino-1,3,5-triazine and their substitution products, etc. Derivatives of melamine also may be employed, e. g., 2,4,6-trihydrazino-1,3,5-triazine, melam, melem, melon, 2,4,6-triethyltriamino-1,3,5-triazines, 2,4,6-triphenyltriamino-1,3,5-triazines, etc. Nuclearly substituted aminotriazines also may be used, e. g., 1-cyano-2-amino-4,6-dimethyl-1,3,5-triazine, 2-chloro-4,6-diamino-1,3,5 - triazine, 6-methyl-2,4-diamino - 1,3,5 - triazine, 2 - alkyl - 4-amino-6-hydroxy-1,3,5-triazines (for example, 2-methyl-4-amino-6-hydroxy-1,3,5 - triazine, etc.), 2-aryl-4-amino-6 - hydroxy - 1,3,5 - triazines (for example, 2-phenyl-4-amino-6-hydroxy-1,3,5-triazine, etc.) and the like. Suitable mixtures of aminotriazines also may be employed.

While I have described my invention with particular reference to the curing of condensation products of an amino-triazine and formaldehyde, with or without other addition agents such, for example, as urea, thiourea, dicyandiamide, etc., it will be understood of course that other modifying bodies may be introduced into the resin before, during or after effecting condensation between the primary components. Thus, as modifying bodies I also may use, for example, monohydric alcohols such as ethyl, propyl, isopropyl, butyl, amyl, etc., alcohols; polyhydric alcohols such as ethylene glycol, diethylene glycol, glycerol, pentaerythritol, trimethylol nitro methane, etc.; mono- and poly-amides; amines; phenols; aminophenols; ketones; etc. The modifying bodies also may take the form of high molecular weight bodies, with or without resinous characteristics, for example lignin, partially hydrolyzed wood products, protein-aldehyde condensation products, phenol-aldehyde condensation products, polyhydric alcohol-polybasic acid condensation products, natural gums and resins, etc. Dyes, pigments, plasticizers, mold lubricants, opacifiers and various fillers (e. g., wood flour, glass fibers, asbestos including defibrated asbestos, mineral wool, mica, cloth cuttings, etc.) may be compounded with the resin in accordance with conventional practice to produce molding compositions best fitted to yield molded articles of optimum properties for the particular service application.

The molding compositions of this invention may be molded into a wide variety of shapes under heat and pressure, more particularly at temperatures of the order of 100° to 200° C. For optimum results I prefer to use temperatures ranging from approximately 120° to 180° C. Molding pressures may be varied considerably, but usually are within the range of 1,000 to 10,000 pounds per square inch, more particularly from about 2,000 to 4,000 or 5,000 pounds per square inch.

The modified and unmodified resinous compositions of this invention have a wide variety of uses. For example, in addition to their use in the production of molding compositions they may be used as laminating varnishes in the production of laminated articles wherein sheet materials, e. g., paper, cloth, sheet asbestos, etc., are coated and impregnated with the resin, superimposed, and thereafter united under heat and pressure. They also may be employed in making protective surfacing materials, for example paints, varnishes, etc., in the manufacture of arc-extinguishing tubes capable of evolving an arc-extinguishing gas under the heat of the arc, in the production of wire or baking enamels, and for bonding or cementing together mica flakes to form a laminated mica article. They also may be used as anti-creasing agents, as impregnants for electrical coils and other electrical devices, and for other purposes. The cured resinous products have excellent resistance to heat, water and moisture, have a high dielectric strength and outstanding arc resistance. Hence they are particularly suitable for electrically insulating and other uses where such properties are highly desirable.

What I claim as new and desire to secure by Letters Patent of the United States is:

1. A composition of matter containing a curing agent comprising oxamide and a soluble, fusible condensation product of a mixture comprising an aminotriazine and formaldehyde.

2. A composition comprising (1) a partial condensation product of ingredients comprising an aminotriazine and formaldehyde that is adapted to be cured to an insoluble, infusible state and (2) an accelerator of curing of said condensation product comprising oxamide in an amount not exceeding substantially one-tenth mol of oxamide per mol of the aminotriazine component of the said condensation product.

3. A heat-curable composition comprising (1) a potentially reactive condensation product of a mixture comprising melamine and formaldehyde and (2) oxamide as an accelerator of curing of the said condensation product.

4. A product comprising the cured composition of claim 3.

5. A heat-curable composition comprising (1) the soluble, fusible condensation product obtained by reaction of a mixture comprising melamine and formaldehyde, the condensation reaction between the said components being carried out in the presence of a condensation catalyst comprising ammonia and a fixed alkali, and (2) oxamide as an accelerator of curing of the said condensation product.

6. A heat-curable composition comprising (1) a potentially reactive condensation product of a mixture comprising melamine, urea and formaldehyde and (2) oxamide as an accelerator of curing of the said condensation product.

7. A product comprising the cured composition of claim 6.

8. A heat-curable composition comprising (1) a potentially reactive condensation product of a mixture comprising melamine, thiourea and formaldehyde and (2) oxamide as an accelerator of curing of the said condensation product.

9. A product comprising the cured composition of claim 8.

10. A heat-curable composition comprising (1) a potentially reactive condensation product of a mixture comprising melamine, dicyandiamide and formaldehyde and (2) oxamide as an accelerator of curing of the said condensation product.

11. A product comprising the cured composition of claim 10.

12. A thermosetting molding composition comprising a soluble, fusible aminotriazine-formaldehyde condensation product and oxamide as an accelerator of curing of the said condensation product.

13. A thermosetting molding composition comprising (1) a soluble, fusible condensation product of a mixture comprising melamine and formaldehyde and (2) an accelerator of curing of said condensation product comprising oxamide in an amount not exceeding substantially one-tenth mol of oxamide per mol of the melamine component of the said condensation product.

14. The method of curing a potentially reactive condensation product of a mixture comprising an aminotriazine and formaldehyde which comprises incorporating into the said condensation product a small amount of oxamide, and subjecting the resulting composition to a temperature of the order of 100° to 200° C. until the said condensation product has cured to an insoluble and infusible state.

GAETANO F. D'ALELIO.